United States Patent [19]

Weaver et al.

[11] Patent Number: 5,166,872
[45] Date of Patent: Nov. 24, 1992

[54] SYSTEM AND METHOD FOR CONTROLLING DEVICES THROUGH COMMUNICATION PROCESSORS AND PLURALITIES OF ADDRESS-ASSOCIATED DEVICE CONTROLLERS SHARING EACH COMMUNICATION PROCESSOR

[75] Inventors: Rand D. Weaver, Milford; David L. Gossman, Melvin; Matthew L. Plagman, Milford, all of Iowa

[73] Assignee: Ability Technologies Corporation, Spencer, Iowa

[21] Appl. No.: 851,116

[22] Filed: Mar. 16, 1992

Related U.S. Application Data

[63] Continuation of Ser. No. 381,119, Jul. 17, 1989, abandoned.

[51] Int. Cl.⁵ .............................................. G05B 15/00
[52] U.S. Cl. ..................................... 364/133; 395/200; 364/DIG. 1; 364/229.2
[58] Field of Search ................... 364/131–139, 364/474.11, DIG. 1, 229–230.6; 395/200

[56] References Cited

U.S. PATENT DOCUMENTS

| | | |
|---|---|---|
| 4,200,930 | 4/1980 | Rawlings et al. |
| 4,437,045 | 3/1984 | Mitsuoka |
| 4,467,436 | 8/1984 | Chance et al. |
| 4,471,427 | 9/1984 | Harris |
| 4,472,770 | 9/1984 | Li |
| 4,484,270 | 11/1984 | Quernemoen et al. |
| 4,503,507 | 3/1985 | Takeda et al. |
| 4,580,207 | 4/1986 | Arai et al. |
| 4,602,345 | 7/1986 | Yokoyama |
| 4,609,855 | 9/1986 | Andrews |
| 4,654,654 | 3/1987 | Butler et al. |
| 4,663,703 | 5/1987 | Axelby et al. |
| 4,692,918 | 9/1987 | Elliott et al. |
| 4,769,766 | 9/1988 | Tung |
| 4,831,582 | 5/1989 | Miller et al. ........................ 364/134 |
| 4,878,002 | 10/1989 | Hentzig et al. ..................... 364/132 |
| 4,879,644 | 11/1989 | Gottshall ............................. 364/132 |
| 4,918,589 | 4/1990 | Floro et al. ........................ 364/132 |

FOREIGN PATENT DOCUMENTS 0156921 10/1985 European Pat. Off.
0311007 4/1989 European Pat. Off.

OTHER PUBLICATIONS

PCIM, Apr. 1989, Smart Motor Integrates Hardware and Software, Davis, Sam.
Boekestein, Walter, Motion Controller als basis component Automatiseren van beweging, Nov. 1988, Polytechnisch Tijdschrifti.
Elektronik, vol. 35, No. 22, Oct. 1986, Naunin et al., "Roboter über seriellen Bus gesteuert".

Primary Examiner—Jerry Smith
Assistant Examiner—Jim Trammell
Attorney, Agent, or Firm—Haugen and Nikolai

[57] ABSTRACT

The system for controlling a plurality of devices includes a central processor that receives information from a user, translates the information into a command and sends the command to a communication processor. The communications processor formulates a device command to send to a remote device processor which is connected in close proximity to a device that the user wants to control. The communication processor also receives status information back from the device processor which has been accessed. The device processor receiving a command uses the command to control the device attached to the device processor. Each device processor is able to monitor the commands sent to other device processors and can be set to use these commands to control their attached device. This method of monitoring allows many devices to be controlled simultaneously with very few commands. The system also allows for different types of devices to be attached to the device controllers so the system can perform a multiplicity of functions.

4 Claims, 10 Drawing Sheets

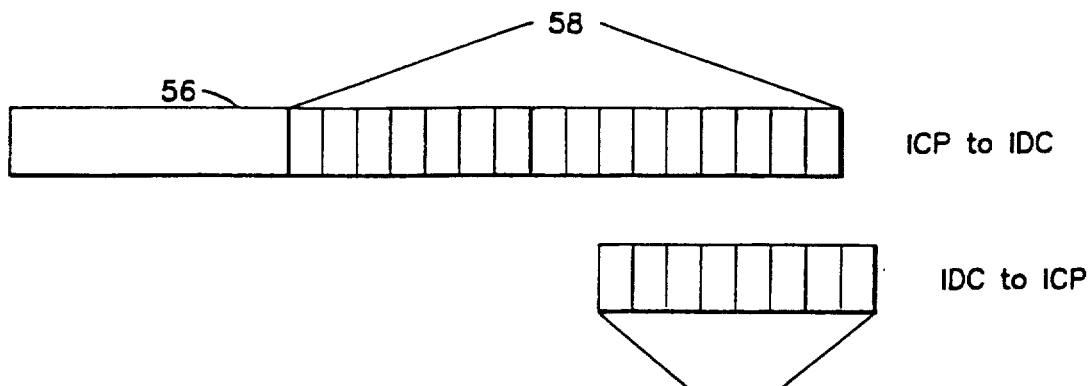
FIG. 2
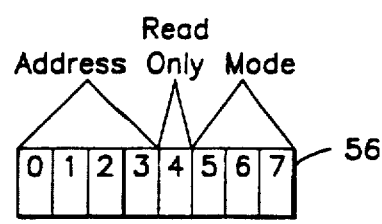
FIG. 3
| PROGRAM | |
|---|---|
| PCPACKET | (16x16) |
| OUTPACKET | (16x16) |
| INPACKET | (16x8) |
| XMIT | (16x1) |
| ACTIVE | (16x1) |
| TxMODE | (16x1) |
| RxMODE | (16x1) |
FIG. 4
| DMD | (16) |
|---|---|
| IPAC | (16) |
| AIPAC | (16) |
| WRKREG | (16) |
| REG625 | (16) |
| IR6REG | (16) |
| OPAC | (8) |
| STACK | (48) |
FIG. 6

SYSTEM AND METHOD FOR CONTROLLING DEVICES THROUGH COMMUNICATION PROCESSORS AND PLURALITIES OF ADDRESS-ASSOCIATED DEVICE CONTROLLERS SHARING EACH COMMUNICATION PROCESSOR

This is a continuation of copending application Ser. No. 07/381,119, filed on Jul. 17, 1989, now abandoned.

BACKGROUND OF THE INVENTION

The present invention relates generally to the field of using microprocessors to control the movement or operation of connected devices. More particularly, the present invention relates to a distributed microprocessor system and method for controlling a plurality of different devices. The present invention is specifically described with respect to controlling servo motors, but an important feature of the present invention is that the system and method are the same for a variety of different devices which can be connected. Other devices that can be connected to the system and controlled include an ultra-sonic ranging unit, an input/output controller, and a power supply controller.

Using a microprocessor to control devices is known in the art. However, the prior art systems for controlling a plurality of devices have the microprocessing functions done in a central location with instructions being transmitted over a mass of wiring to the connected devices. This type of system is not only costly and difficult to repair because of the wiring, it is large and bulky and in no way mobile. Furthermore, these systems control each device with completely separate instructions which makes it difficult to integrate the operation of devices or operate the devices above a certain speed.

The present invention solves these and other problems by providing a distributed system of microprocessors with the time sensitive processing tasks being done with a microprocessor controller that is physically connected to the device. Having a dedicated microprocessor physically connected to each device drastically reduces the amount of wiring and heat and makes repair much simpler.

Moreover, because of the drastic reduction in wiring and complexity, a complete intelligent device controller system can easily fit in a mobile unit which is small enough to fit through a standard doorway and hence can move throughout offices or homes. Furthermore, the system and method of the present invention allows not only different types of devices to be interchangeably connected to the system, but allows different types of devices to be connected at the same time. This allows for a system that is not only small and mobile, but capable of performing a variety of different tasks such as moving throughout an office, finding switches and turning them on or off, for example.

Also, the distributed microprocessors of the present invention and the method of communication allows a plurality of devices to be simultaneously controlled in an efficient and real time manner. More specifically, the present invention is capable of controlling several different devices with just one instruction by having the microprocessors attached to the devices receive instructions and replies from other microprocessors connected to other devices, or in other words, the microprocessors can "spy" on one another.

SUMMARY OF THE INVENTION

The present invention relates to a system for controlling a plurality of devices which includes a central processor and at least one communication processor connected to the central processor. The system also includes a plurality of device processors, each having a memory for storing device commands, status information and data, and a serial bus connecting the communication processor to each device processor and each device processor further connected to one of the plurality of devices. The system further includes instruction means connected to the central processor for receiving a user instruction for simultaneously controlling the operation of preselected ones of the plurality of devices, translating the user instruction to a command and communicating the command to the communication processor. The system also includes a first communication means connected to the communication processor for receiving a command from the central processor, formulating a device command from the received command, sending the device command to a selected device processor connected to the device to be controlled by the device command, and for receiving status information about the controlled device from the selected device processor. Also included is second communication means connected to each device processor for receiving device commands directly from the communication processor and for sending status information about the connected device to the communication processor and monitor means for each device processor for monitoring and storing in the memory device commands sent by the first communication means to other devices processors and for monitoring and storing in the device processor memory status information sent by the second communication means of other device processors to the communication processor. Further, control means are included for each device processor for controlling the operation of the connected device based either on a device command received by the device processor directly from the second communication means or based on a device specific command calculated by using prestored data and the device command stored by the monitor means or by using prestored data and the status information stored by the monitor means.

The method of simultaneously controlling several of the devices of the present system starts with a user providing instructions to a computer which then formulates commands from these instructions. These commands are then sent to a communication processor which receives the commands and formulates a device command from the received commands. This device command is then sent to the device processor connected to one of the several devices. This device command is monitored by the device processors connected to the other of the several devices. The device processor that received the device command directly and the device processors that monitored the device command store the device command in memory. The device specific commands are calculated for the several devices connected to the device processors by using data prestored in the device processors and the device command. Finally, the device specific commands are used to simultaneously control the operation of the several devices.

These and various other advantages and features of novelty which characterize the invention are pointed out with particularity in the claims annexed hereto and forming a part hereof. However, for a better understanding of the invention, its advantages, and objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views;

FIG. 2 is a diagrammatical representation of the communication protocol between the ICP 14a and IDC group 22 of the present invention.

FIG. 3 is a diagrammatical representation of the bits of wake-up byte 56 of the present invention.

FIG. 4 is a diagrammatical representation of a portion of the m ICP 14a of the present invention.

FIG. 6 is a diagrammatical representation of a portion of the memory of IDC 22a of the present invention.

DETAILED DESCRIPTION OF A PREFERRED EMBODIMENT

Figure 1:
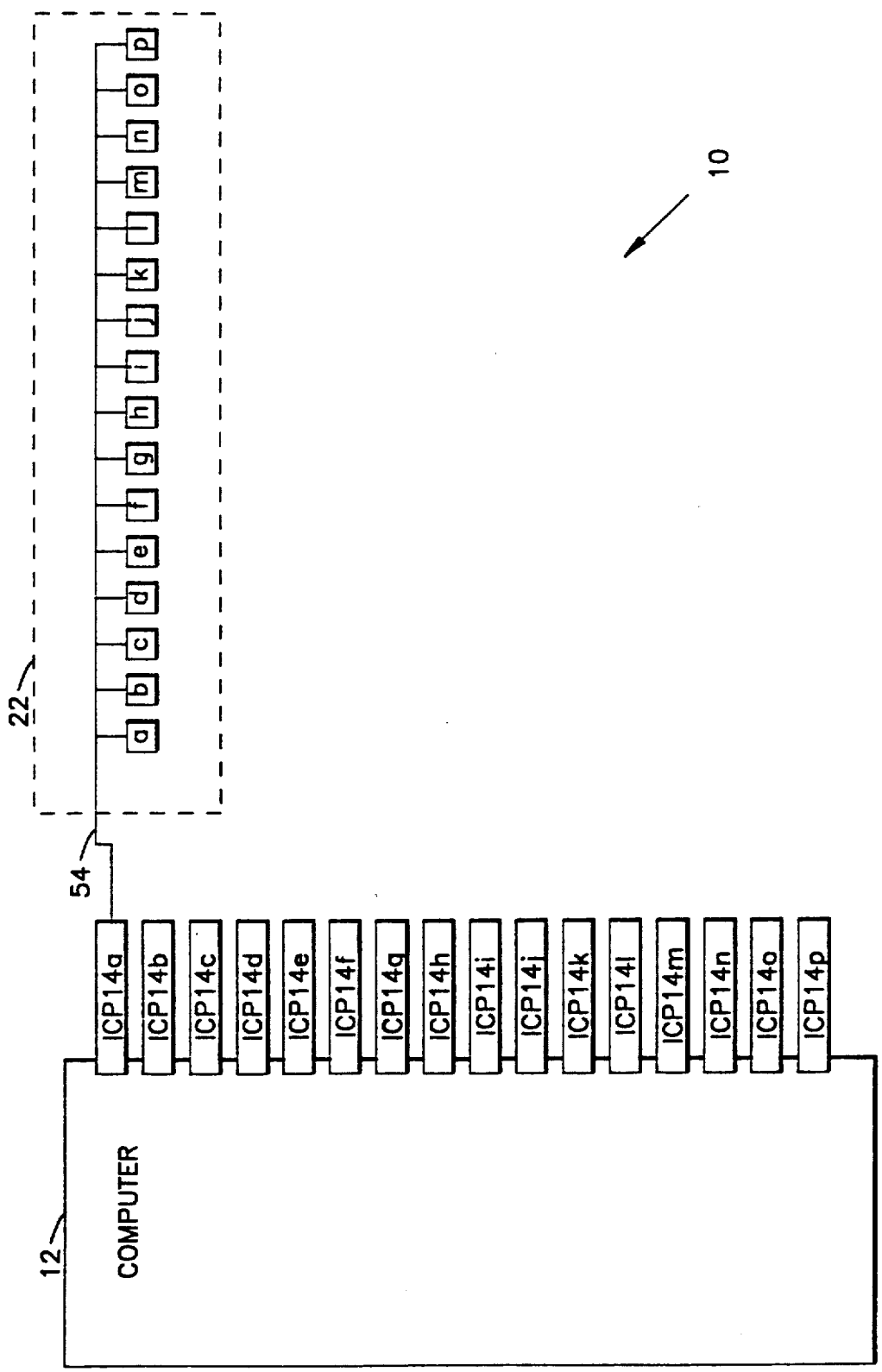
FIG. 1 is a block diagram of intelligent device controller system 10.

Focusing now on FIG. 1, intelligent device controller system 10 includes computer 12 which uses device controller operating system (DCOS). In the preferred embodiment, computer 12 is a personal computer. Computer 12 has the capability of receiving sixteen intelligent communication processor boards (ICPs) 14a-p. The ICPs can communicate with each other through computer 12.

Each ICP can also communicate with up to sixteen intelligent device controllers (IDCs). In FIG. 1, ICP 14a is shown connected to IDC group 22, which includes IDCs 22a-p, via two-wire high speed bidirectional serial data bus 54. Each of the individual IDCs 22a-p is connected to bus 54 in a daisy-chained fashion. Each of IDCs 22a-p is connected to and controls a device which is not shown in FIG. 1. Several different types of devices can be connected to IDCs 22a-p. These different types of devices include a servo controller, an ultra-sonic ranging unit, an input/output controller and a power supply controller. Intelligent device controller system 10 is designed so that different types of devices can be connected to IDCs 22a-p at the same time. For instance, IDC 22a could be connected to an ultra-sonic ranging unit and IDC 22b could be connected to a servo controller. For the purposes of this description, IDCs 22a-p will be described as connected to servo controllers which are each moving a part of a robotic arm or mechanism in a certain direction.

Each of the other ICPs shown in FIG. 1 can also be connected to up to sixteen IDCs via a high speed serial bus such as bus 54. The description of the interaction between ICP 14a and its associated IDC group 22 will suffice as a description of the interaction between the other ICPs and their associated IDCs.

DCOS of computer 12 allows a user to interface with intelligent device controller system 10 using a high level language which is independent of the specific IDCs and the devices attached to them. A user using DCOS can control an individual device connected to an IDC by designating that device and then setting parameters for the operation of the device such as position, velocity and acceleration in the case of a servo controller.

ICP 14a includes a microprocessor with dual port memory that is mapped into usable computer 12 memory space. In the preferred embodiment, the microprocessor is a single chip Z8800 Zilog TM Super 8 microprocessor. Computer 12 is able to send data to and receive data from ICP 14a because of the shared memory space. The primary function of ICP 14a is to transfer data to and from IDCs 22a-p via serial bus 54. ICP 14a can also assist ICP 14a and IDCs 22a-p with processing tasks because ICP 14a spends only a small percentage of time handling communications.

All the IDCs in the present invention are identical so the description of IDC 22a will suffice as a description of all the IDCs. IDC 22a includes a microprocessor and its support circuitry and additional application specific software and hardware. In the preferred embodiment, the microprocessor is a single chip Z8800 Zilog TM Super 8 microprocessor. The microprocessor section of IDC 22a participates in controlling the communication between IDC 22a and ICP 14a as well as controlling the application specific hardware included in IDC 22a. The application specific software and hardware are the only components of IDC 22a, and for that matter, the system, that change depending on what type of device is attached to IDC 22a.

Because IDC 22a has its own microprocessor, time sensitive control of IDC 22a can be done at the IDC level rather than at the ICP 14a level. Furthermore, the provision of a microprocessor with each of IDCs 22a-p minimizes connections and wiring between the IDCs 22a-p and ICP 14a. This distribution of some of the control function away from computer 12 and ICP 14a also saves on costs and heat and thus the system is more reliable and easier to repair.

FIGS. 2 and 3 help illustrate the communication protocol on serial bus 54. Focusing on FIG. 2, ICP 14a periodically transmits wake-up byte 56, which contains the address of one of IDCs 22a-p, to IDC group 22. After transmitting wake-up byte 56, ICP 14a may transmit 16 byte data packet 58 to the IDC of IDCs 22a-p that is addressed by wake-up byte 56. Transmission of packet 58 is optional. Whether packet 58 is sent or not, ICP 14a receives 8 byte data packet 60 from the IDC addressed by wake-up byte 56. In the preferred embodiment, ICP 14a repeats this sequence for each one of IDCs 22a-p.

After ICP 14a has attempted to communicate with all of IDCs 22a-p, ICP 14a, instead of transmitting wake-up byte 56, transmits a sync byte in the preferred embodiment. All IDCs 22a-p receive the sync byte and use it as a periodic interrupt. The transmission of the sync byte is the only event in the synchronization interrupt communication.

In the preferred embodiment, ICP 14a transmits wake-up byte 56 every 588 microseconds. All IDCs 22a-p receive wake-up byte 56, causing a 1700 Hz periodic interrupt to each of IDCs 22a-p. The sync byte which is also received by all of IDCs 22a-p, creates a periodic interrupt source of 100 Hz.

FIG. 3 shows the 8 bits, 0-7, of wake-up byte 56. Bits 0-3 are address bits. In the preferred embodiment, each of IDCs 22a-p is assigned a primary address and also a secondary address, which is really the address of one of the other IDCs in IDC group 22. When each of IDCs 22a-p receives wake-up byte 56, IDCs 22a-p compare their respective primary addresses to bits 0-3. The IDC of IDCs 22a-p whose primary address matches bits 0-3 of wake-up byte 56 then prepares for more communications. That particular IDC then checks bit 4 of wake-up byte 56, which is a read only bit. If bit 4 is low, that IDC prepares to receive 16 data packet 58, or if bit 4 was high, that IDC will transmit 8 byte data packet 60 back to ICP 14a.

Bits 5-7 of wake-up byte 56 are mode bits and indicate to the IDC primarily addressed by wake-up byte 56 the significance of the data that the IDC will receive in data packet 58 or which data the IDC should transmit back to ICP 14a in data packet 60. If bit 4 is high, mode bits 5-7 indicate the receive mode and indicate to the primarily addressed IDC what data it should transmit to ICP 14a as data packet 60. If bit 4 is low, mode bits 5-7 indicate transmit mode and tell the primarily addressed IDC the significance of the data it is about to receive in data packet 58. In this last instance, the primarily addressed IDC then uses the receive mode received most recently for its data packet 60 reply.

An important feature of the present invention is that each one of IDCs 22a-p is assigned a secondary address, as well as a primary address. The provision of a secondary address allows an IDC to monitor transmissions to and replies from other IDCs in its group. This is accomplished in the following manner. The one IDC of IDCs 22a-p whose primary address matches bits 0-3 of wake-up byte 56 will be referred to as the primary IDC and the IDCs whose secondary address matches bits 0-3 of wake-up byte 56 will be referred to as secondary IDCs. When ICP 14a transmits data packet 58 to the primary IDC, the secondary IDCs also receive data packet 58. When ICP 14a finishes transmitting data packet 58, the primary IDC transmits data packet 60 back to ICP 14a. The secondary IDCs can also receive data packet 60. This mode of operation is referred to as the spy mode.

In the case where the secondary IDCs receive data packet 58 from ICP 14a, these secondary IDCs can mimic whatever action is being taken by the primary IDC. Also, the secondary IDCs can use data packet 60, the reply from the primary IDC to ICP 14a, as the basis for an action. For example, if both the primary and a secondary IDC are controlling servo motors, the secondary IDC can use the current position information of the primary IDC, the information contained in data packet 60, multiply it by a scaling factor and use it as the desired position for that secondary IDC. This allows for an "electronic gearing" effect.

To give a more specific example, if all of IDCs 22a-p are controlling servo motors to move a device to a certain position in incremental steps, fifteen of IDCs 22a-p can be programmed to spy by having their secondary addresses programmed to be the address of the other IDC in the group, which will be the primary IDC. Then, when ICP 14a sends parameter values, such as a ratio of the total required move distance, to the primary IDC, each of the other fifteen IDCs will receive that same ratio. These fifteen other IDCs can then multiply that ratio by the unique predetermined target position of that particular IDC, information which has already been sent to those IDCs, to obtain a current desired position.

The communication protocol also provides for error checking. The system checks for errors in the last communication at the beginning of every 588 microsecond interrupt, the 1700 Hz periodic interrupt. ICP 14a checks its receiver and if this receiver is still enabled, ICP 14a recognizes that the prior attempted communication to an IDC was incomplete and that an error has occurred. ICP 14a disables the receiver and the error count for the primary IDC addressed by the last wake-up byte 56 is updated.

The communications between computer 12, ICP 14a and IDCs 22a-p can now be more fully explained. As explained above, the communications between these processors is the same no matter what type of device is attached to the IDCs involved. For the purposes of this description, servo controllers will be the type of device attached to IDCs 22a-p. As mentioned above, a user uses the high level commands of DCOS to direct certain IDCs to move devices to specific positions using specific velocities and accelerations. DCOS of computer 12 checks for syntax errors, illegal commands and out-of-range data. If the data and commands are proper, the commands are reduced to low level controller format and the data for controlling a device associated with an IDC is passed to the ICP associated with that specific IDC. For instance, if a user wanted to move the servo controller connected to IDC 22a to a new position, computer 12 would pass the converted data to ICP 14a. When ICP 14a's periodic wake-up byte 56 addresses IDC 22a, ICP 14a would transmit information to IDC 22a regarding the move the user wished the servo controller to make. This information would be contained in 16 byte data packet 58. IDC 22a would then respond with status information about the servo controller attached to it, including the current position of the servo controller, in 8 byte data packet 60. When ICP 14a addresses one of IDCs 22a-p with wake-up byte 56, but does not have information to transmit to that IDC, 16 byte data packet 58 is not transmitted, but the primary IDC still responds with status information in 8 byte data packet 60.

There are several types of communication which can take place between ICP 14a and IDCs 22a-p. In the two types of primary communication, none of IDCs 22a-p has a secondary address which matches the address of the primary IDC. In the first type of primary communication, ICP 14a transmits wake-up byte 56 and 16-byte data packet 58. The primary IDC transmits 8 byte data packet 60 to ICP 14a. The primary IDC then acts on the data packet 58 received from ICP 14a. In the second type of primary communication, ICP 14a transmits only wake-up byte 56. The primary IDC then transmits 8 byte data packet 60.

There are four types of secondary communication in which at least one IDC has a secondary address that matches the address of the primary IDC. These four types of secondary communication will be referred to as spy mode 1, spy mode 2, spy mode 3 and spy mode 4. In spy mode 1, ICP 14a transmits wake-up byte 56 and 16 byte data packet 58. The primary IDC transmits 8 byte data packet 60 to ICP 14a. The secondary IDCs receive 16 byte data packet 58, but send no reply to ICP 14a. The primary IDC and the secondary IDCs then act on data packet 58 received from ICP 14a. In spy mode 2, ICP 14a transmits wake-up byte 56 and 16 byte data packet 58. The primary IDC transmits 8 byte data packet 60 to ICP 14a. The secondary IDCs receive 16 byte data packet 58 and 8 byte data packet 60 reply transmitted from the primary IDC to ICP 14a. Thus, the secondary IDCs receive a total of 24 bytes. In this spy mode, the primary IDC acts on data received from ICP 14a and the secondary IDCs act on data received from the primary IDC.

In spy mode 3, ICP 14a only transmits wake-up byte 56. The primary IDC transmits 8 byte data packet 60 to ICP 14a and the secondary IDCs take no action.

In spy mode 4, ICP 14a only transmits wake-up byte 56. The primary IDC transmits 8 byte data packet 60 to ICP 14a. The secondary IDCs also receive 8 byte data packet 60. In this spy mode, the secondary IDCs then act on 8 byte data packet 60 received from the primary IDC.

The servo control will now be explained briefly with more details given below. The microprocessor of one of IDCs 22a-p attached to a servo controller models a perfect servo for the desired move. At each time interval during the desired move, this perfect servo will give the position of an ideal motor. The servo control is accomplished by having, at any one time, the real motor mimic as closely as possible the ideal motor position indicated by the perfect servo at that time. In this servo control system, the error at any given time in the real motor position can easily be calculated by subtracting the real motor position from the ideal motor position at that time. There is no need to keep track of any other parameters, such as where the real motor started or where it is going to end up, to determine the error. The real motor simply tracks the ideal motor as closely as possible. This is in contrast to other servo systems where the real motor is allowed to travel to a certain position and then the starting and proposed finishing positions are analyzed to determine where the real motor should be and then the position error is calculated. This involves many parameters and many calculations. In the present invention, corrections are made to the real servo motor based simply on the difference between the ideal motor position and the real motor position calculation.

ICP 14a will now be described in detail. As noted above, ICPs 14a-p are all identical so a description of ICP 14a will suffice as a description for ICPs 14a-p. As explained above in regard to the communication protocol, in the preferred embodiment, ICP 14a addresses IDCs 22a-p one at a time starting with IDC 22a through IDC 22p and then ICP 14a transmits a sync byte. This process is then repeated. Because ICP 14a does not use all of its capacity on the communications with IDCs 22a-p, ICP 14a can also perform processing functions. ICP 14a performs as directed by computer 12 on the data for the next IDC to be communicated with at the same time ICP 14a is communicating with the current IDC. ICP 14a can perform both of these tasks at the same time because of the interrupt systems explained below in more detail.

FIG. 4 shows the layout of the relevant section of memory of ICP 14a. The PROGRAM area of memory contains the instructions for operating on data received by ICP 14a. The PCPACKET area of memory contains 16 data packets with each data packet containing 16 bytes. These 16 data packets are for transfer from computer 12 to ICPs 14a-p shown FIG. 1. (Remember that the memory of these ICPs are mapped into usable memory space of computer 12). The last byte in each of these 16 data packets is the data code for the data. The code informs ICP 14a, or, in some cases, one of IDCs 22a-p, what meaning the data has.

The OUTPACKET area shown in FIG. 4 also contains space for 16 data packets with each data packet including 16 bytes. The data packets in the OUTPACKET area are for transfer from ICP 14a to IDCs 22a-p. The last byte in each of the OUTPACKET data packets is again the data code for informing IDCs 22a-p what meaning the data has.

The INPACKET area shown in FIG. 4 contains space for 16 data packets with each data packet including 8 bytes. The data packets in the INPACKET area have been transferred from IDCs 22a-p to ICP 14a. The INPACKET area shown in FIG. 4 is directly accessible by computer 12.

The XMIT area shown in FIG. 4 contains space for 16 flags where each flag is one byte. These flags are used to signal the communication interrupts, to be discussed below, that there is data to be transmitted to an IDC.

The ACTIVE area shown in FIG. 4 also contains space for 16 flags, where each flag is one byte. Computer 12 sets these flags selectively to signal ICP 14a that data has been placed in a packet and should be operated on. These flags are not reset until ICP 14a has completed the task given to it by computer 12. Therefore, these ACTIVE flags double as busy indicators to computer 12.

The TxMODE area shown in FIG. 4 contains space for 16 flags where each flag is one byte. The TxMODE flags are used by computer 12 to signal ICP 14a what transmit mode number ICP 14a should transmit in wake-up byte 56 sent to IDCs 22a-p. This transmit mode number informs IDCs 22a-p how to store any data received.

The RxMODE area shown in FIG. 4 contains space for 16 flags where each flag is one byte. The RxMODE flags are used by computer 12 to inform ICP 14a what receive mode number ICP 14a should transmit in wake-up byte 56 sent to IDCs 22a-p. The receive mode number informs the IDC addressed in wake-up byte 56 what data it should transmit back to ICP 14a.

Figure 5A:
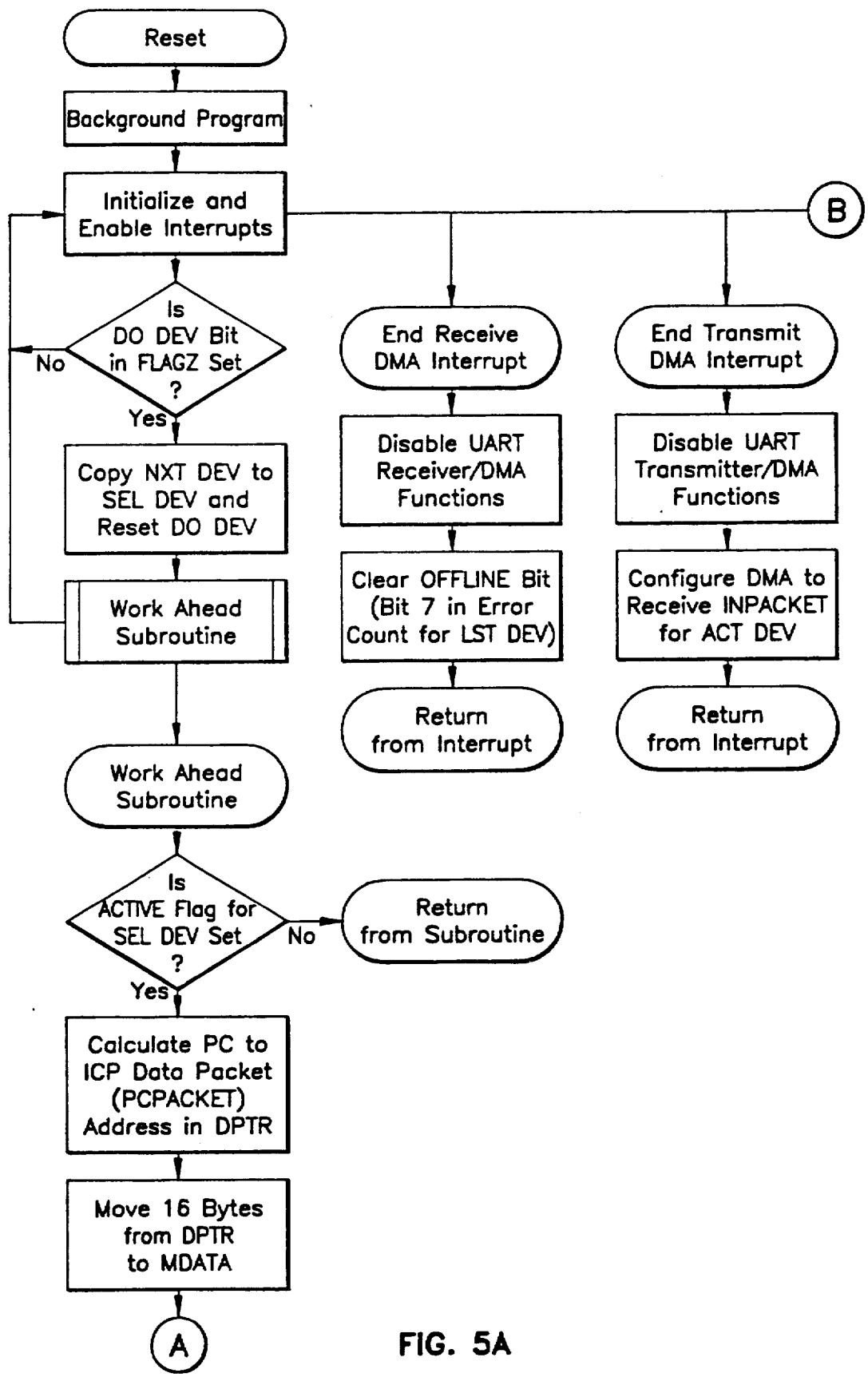
FIGS. 5A-5C are flow charts showing the operation and method of use of ICP 14a of the present invention.
Figure 5B:
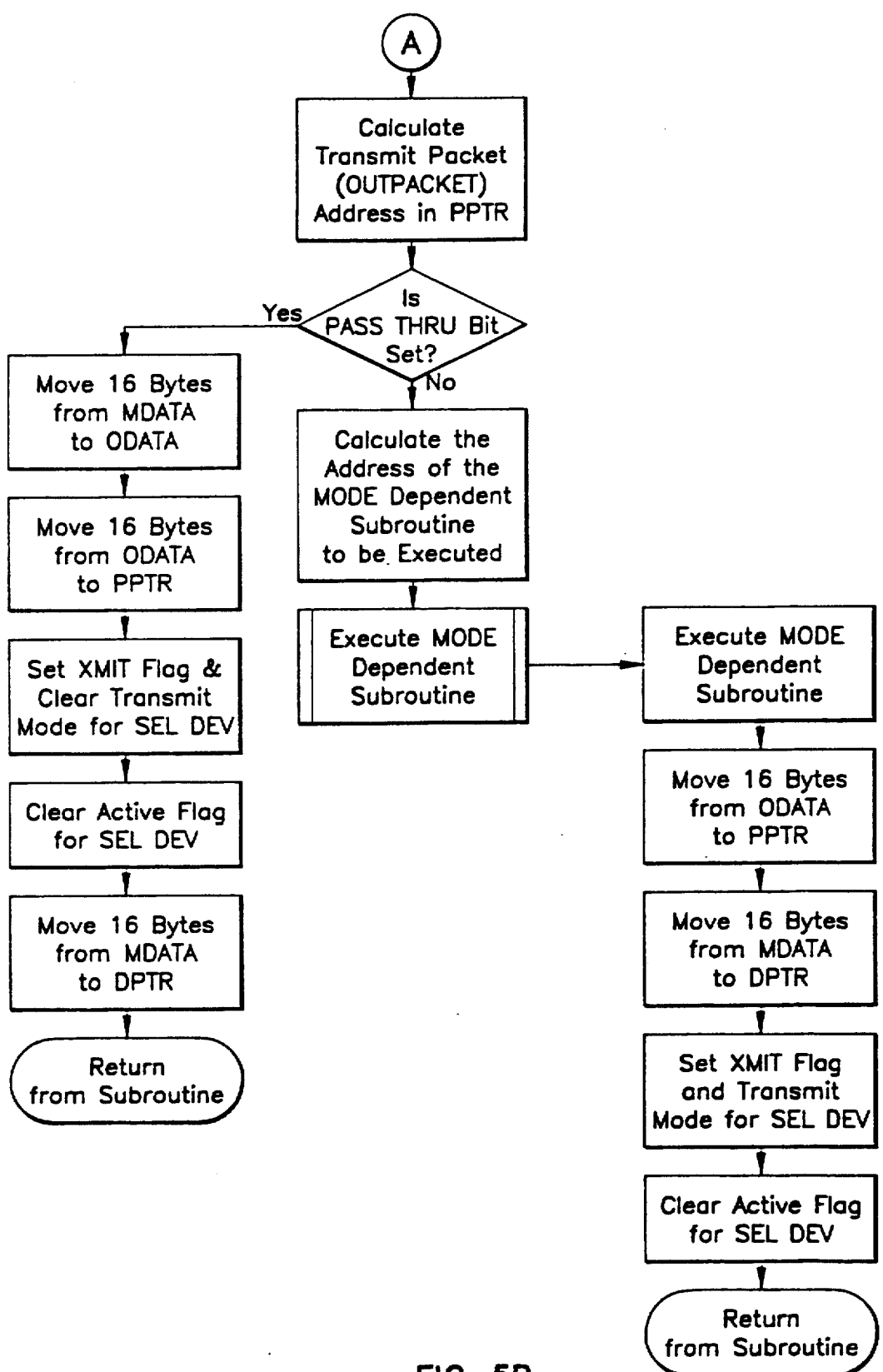
Figure 5C:
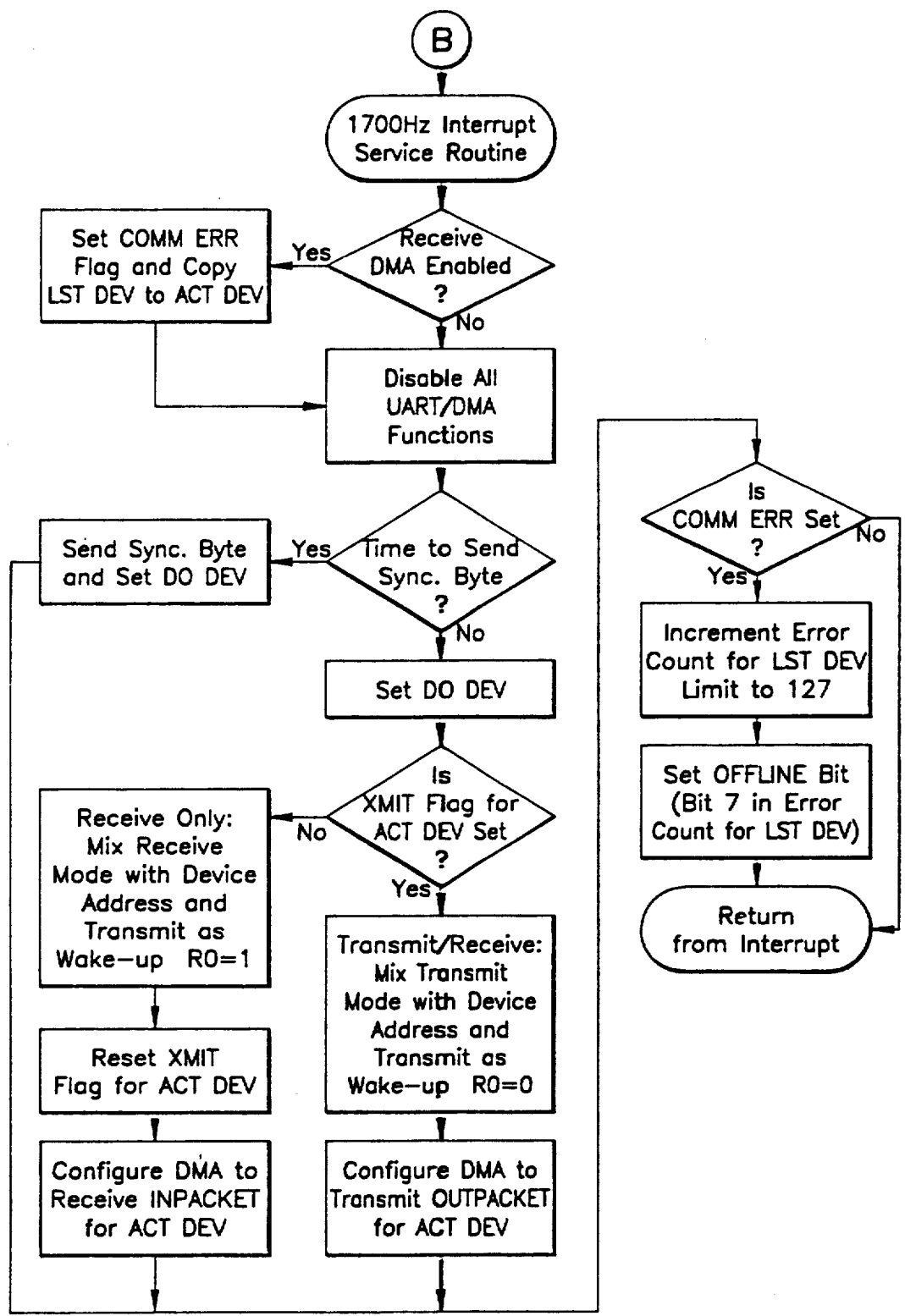
Figure 7A:
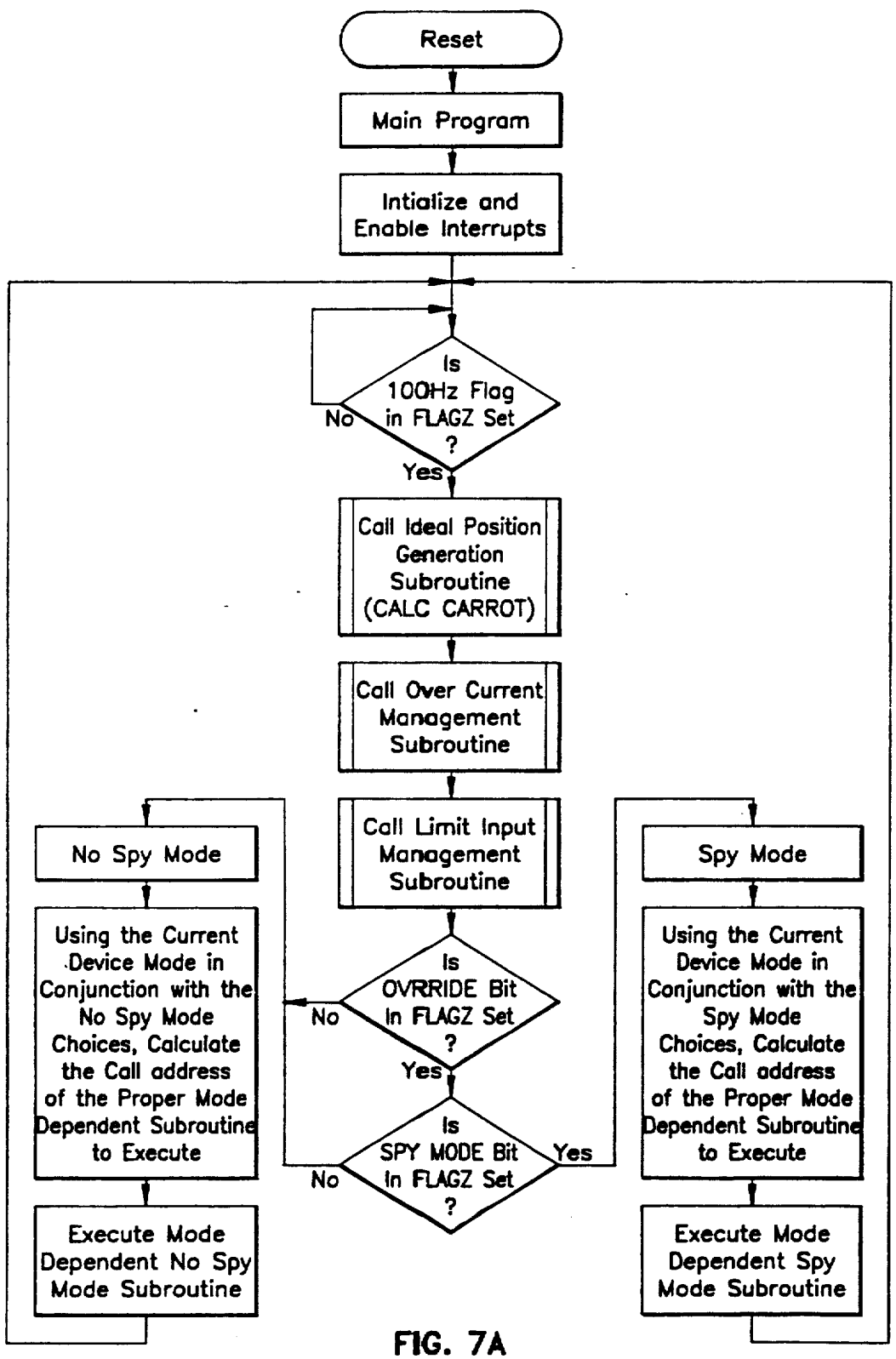
FIGS. 7A-7E are flow charts showing the operation method of use of IDC 22a of the present invention.
Figure 7B:
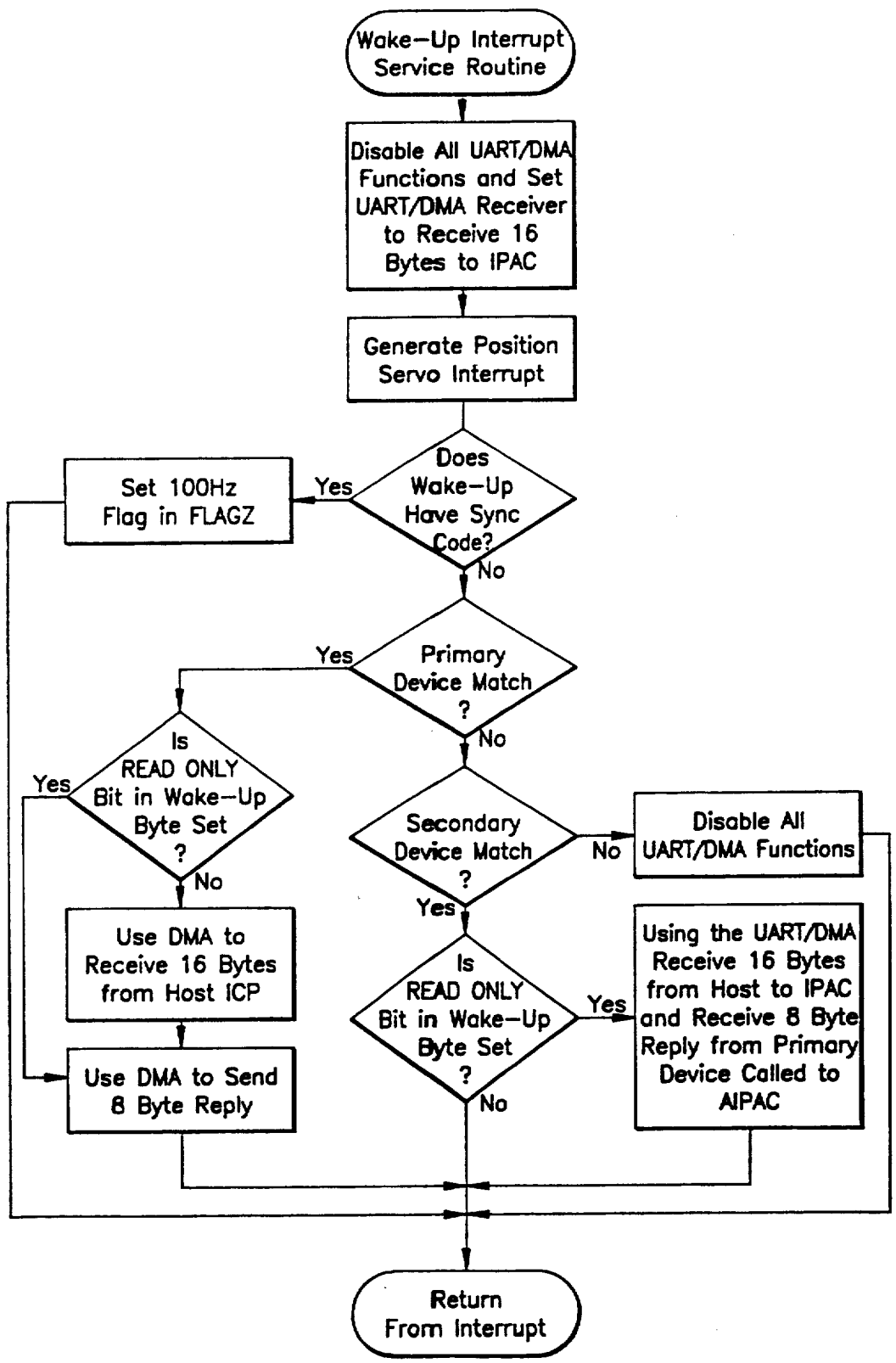
Figure 7C:
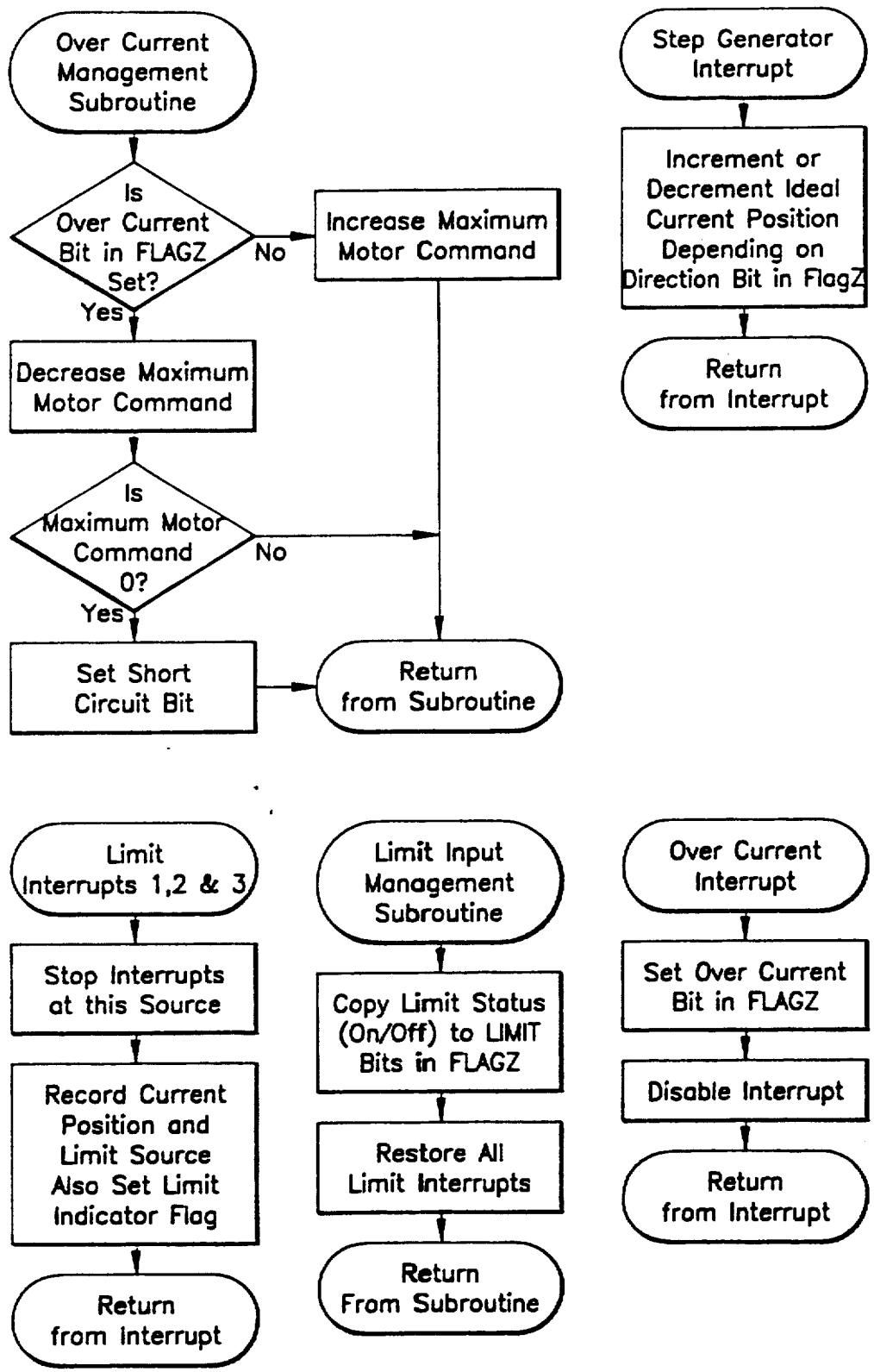
Figure 7D:
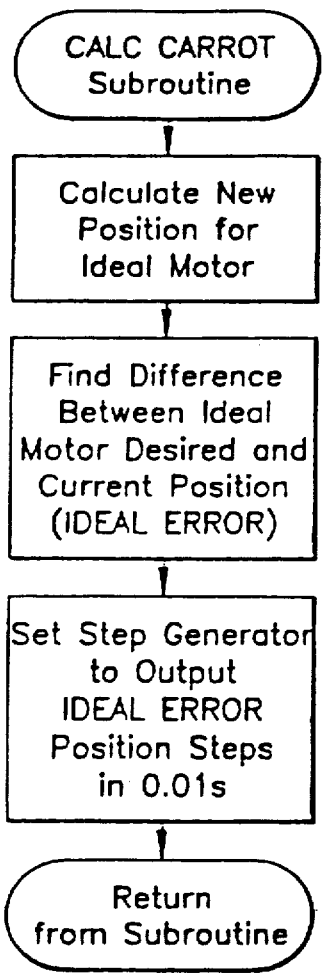
Figure 7E:
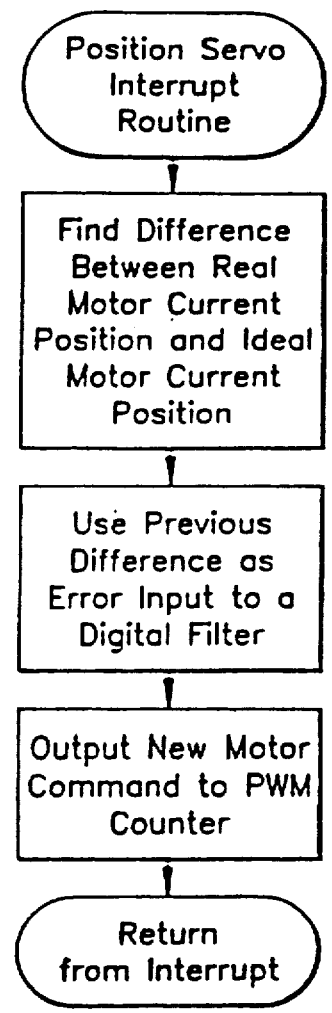

The program structure and operation of ICP 14a will now be described in detail with reference to FIGS. 5A-5C which are flow charts of the programs and subroutines of ICP 14a. The interrupt service routines of ICP 14a will be explained first. Every 588 microseconds a counter in ICP 14a overflows and causes an interrupt to the 1700Hz Interrupt Service Routine. The 1700Hz Interrupt Routine is the starting point for all communications. Every time this interrupt occurs, a communication, successful or not, will occur. The first step in the 1700Hz Interrupt Routine is to check for errors from the last communication. A communication team consisting of a universal synchronous receiver transmitter (UART)/direct memory access (DMA) is used for communications between ICP 14a and associated IDCs 22a-p. The DMA transmits data to and from the memory of ICP 14a and the UART translates parallel data to serial data to be communicated to an IDC over a coaxial serial cable and translates serial data to parallel data received from an IDC over the coaxial cable. The 1700 Hz Interrupt Routine checks for errors by determining whether the UART receiver/DMA team is still enabled. If it is still enabled, this means the IDC addressed by the last wake-up byte 56 has not responded with data packet 60. The UART receiver/DMA team is then immediately disabled and a COMM ERR flag is set and the number of the last device communicated with (LST DEV) is copied to ACT DEV. The error is taken care of later on in the 1700Hz Interrupt Routine when time is not as critical. If the DMA was not still enabled, all UART/DMA functions are disabled.

After errors are checked for, the 1700 Hz Interrupt Routine determines whether it is time to transmit the synchronization byte to IDCs 22a-p by determining whether the next IDC to be communicated with (NXT DEV) is 16. If NXT DEV is 16 this means that all of IDCs 22a-p have been communicated with. The 1700 Hz Interrupt Routine transmits the synchronization byte, sets a DO DEV flag in the FLAGZ section of memory ICP 14a, not shown in FIG. 4, and resets NXT DEV. If NXT DEV is not 16, meaning the IDC to be communicated with (ACT DEV) is 0-15 (corresponding to IDCs 22a-p), DO DEV is also set. Setting DO DEV, as will be explained later, informs a Background Program, which monitors DO DEV, to begin a subroutine called Work Ahead. While ICP 14a is communicating with ACT DEV, the Work Ahead Subroutine is processing data and instructions for the communication that will next take place between ICP 14a and NXT DEV.

The next step in the 1700 Hz Interrupt Routine is that the transmit flag XMIT for ACT DEV is checked. If this flag is not set, ICP 14a will not transmit optional 16 byte data packet 58, but will receive the 8 byte data packet 60 reply from ACT DEV. This is called a Receive Only situation. If the XMIT flag for ACT DEV is set, this indicates that ICP 14a will transmit optional 16 byte data packet 58 and receive the 8 byte data packet 60 reply from ACT DEV. This is called Transmit/Receive situation.

In the Receive Only situation, the receive mode information for ACT DEV is retrieved from the RxMODE location in ICP 14a's memory, as shown in FIG. 4. This RxMODE number, the address of ACT DEV, and the Read Only bit, which is set in this instance, are combined to form wake-up byte 56. This Wake-up byte 56 is then transmitted by ICP 14a to all of IDCs 22a-p. When ACT DEV receives wake-up byte 56, it will begin to reply to ICP 14a with 8 byte data packet 60 consisting of information dictated by the RxMODE information. At the same time, the XMIT flag for ACT DEV is reset and ICP 14a sets up its UART receiver/DMA team to automatically receive 8 byte data packet 60 and store it in the INPACKET area of the memory of ICP 14a, shown in FIG. 4. After the UART receiver/DMA team has received all 8 bytes of packet 60, an interrupt called End Receive DMA is generated to disable the UART/DMA team and the Background Program is allowed to execute until the next 1700Hz interrupt.

As mentioned above, the Transmit/Receive situation is executed when the XMIT flag of ACT DEV is set. ICP 14a transmits 16 byte data packet 58 and then receives the 8 byte data packet 60 reply from ACT DEV. In this situation, the transmit mode information is obtained from the TxMODE area of the memory of ICP 14a and this information is combined with the address of ACT DEV and the READ ONLY bit, which is cleared in this instance, to form wake-up byte 56. This wake-up byte 56 is then transmitted by ICP 14a to all of IDCs 22a-p. When ACT DEV receives wake-up byte 56, ACT DEV will prepare to receive 16 byte data packet 58 from ICP 14a. At the same time, ICP 14a prepares the UART transmitter/DMA team to transmit 16 byte data packet 58 from the OUTPACKET area of the memory of ICP 14a. After the UART transmitter/DMA team has transmitted all 16 bytes of packet 58, it will generate an interrupt called End Transmit DMA to signal that all 16 bytes have been transmitted. This interrupt disables the UART transmitter/DMA team, calculates the address in INPACKET where 8 byte data packet 60 will be stored, and then enables the UART receiver/DMA team.

At this point in the 1700Hz Interrupt Routine, the Routine checks to see if COMM ERR is set and if it is, the error count for LST DEV is incremented and a bit in the error count for LST DEV is set. Then, and if COMM ERR is not set, control is returned to the Background Program.

As mentioned above, while ICP 14a is actually communicating with one of IDCs 22a-p, ICP 14a is also processing data for the communication to the next IDC to be communicated with (NXT DEV) with the Work Ahead Subroutine. The Background Program monitors the DO DEV bit in FLAGZ, called SEL DEV and begins the Work Ahead Subroutine. This DO DEV bit is set in the 1700Hz Interrupt Routine. SEL DEV is the variable used in the Work Ahead Subroutine to indicate which IDC is being worked on by the Subroutine.

In the Work Ahead Subroutine, the ACTIVE area of the memory of ICP 14a, shown in FIG. 4, is checked to determine whether the ACTIVE flag for the IDC for which data is being prepared, SEL DEV, is active. If the flag is cleared, then there is no function for ICP 14a to perform and ICP 14a returns to the Background Program. If the ACTIVE flag for the SEL DEV is set, the address of the data packet in the PCPACKET area of the memory of ICP 14a, shown in FIG. 4, is calculated and stored in a variable called DPTR. DPTR is a memory pointer which points to the data that computer 12 has earmarked for ICP 14a to send SEL DEV. The Work Ahead Subroutine then moves the 16 bytes in PCPACKET pointed to by DPTR to an internal memory section of ICP 14a called MDATA. This is done for two reasons. The first is that ICP 14a will be operating on this data and it could be fatal if computer 12 were to accidentally or otherwise change this data. When the data is in ICP 14a internal memory, it is protected from computer 12. The second reason is that it enables the processor of ICP 14a to work on the data faster.

After the 16 bytes have been moved to MDATA, ICP 14a calculates the address of the data packet in the OUTPACKET section of the memory of ICP 14a for SEL DEV and stores this address in a variable called PPTR. PPTR is a memory pointer which points to the data that will be transmitted to SEL DEV if necessary.

At this point, the function code, which is normally the 16th byte of the data packet in PCPACKET, resides in the 16th byte of the MDATA memory area. The PASS THRU bit, bit 7, of this function code is checked. If the PASS THRU bit is set, then all 16 bytes of data at MDATA are copied to another internal memory area of ICP 14a called ODATA. The XMIT flag for SEL DEV is set and the TxMODE for SEL DEV is cleared. Then 16 bytes are moved from the ODATA area of the internal memory of ICP 14a to the address in the OUTPACKET area called PPTR. The flag pertaining to SEL DEV in the ACTIVE area of ICP 14a's memory is cleared. Finally, 16 bytes are moved back from MDATA to DPTR because ICP 14a has limited internal memory space. Control is then returned to the Background Program.

It can be seen that the PASS THRU function is used to prevent unnecessary processing by ICP 14a. In certain instances, there is no need for ICP 14a to act on the data it receives from computer 12. In these instances, ICP 14a simply passes data from computer 12 to the addressed IDC.

If the PASS THRU bit, bit 7 of the function code, is clear, the function byte is used as a function code for ICP 14a and ICP 14a calculates the address, using the function code, to call up a MODE dependent subroutine for processing data received from computer 12 and preparing 16 byte data packet 58 to be transmitted to SEL DEV during the next communication.

There are 12 MODE dependent subroutines which can be used to formulate 16 byte data packets 58. In mode 0, ICP 14a instructs SEL DEV to do nothing. In mode 1, ICP 14a gives SEL DEV distance constants in preparation for a trapezoidal velocity profile move, explained below. In mode 2, ICP 14a instructs SEL DEV to execute a trapezoidal velocity profile move. In mode 3, ICP 14a sets the desired position of SEL DEV. In mode 4, ICP 14a sets the motor of SEL DEV in a constant power mode at a duty cycle of x ranging from, plus or minus 127. In mode 5, ICP 14a determines the receive mode information for SEL DEV. In mode 6, ICP 14a determines the transmit mode information for SEL DEV. In mode 7, ICP 14a presets the current position of SEL DEV. In mode 8, ICP 14a sets SEL DEV to a constant velocity of x. In mode 9, ICP 14a instructs SEL DEV to accelerate to a new velocity. In mode 10, ICP 14a sets new gain constants for SEL DEV. In mode 11, ICP 14a enables SEL DEV and in mode 12, ICP 14a disables SEL DEV.

After ICP 14a has completed the MODE dependent subroutine, 16 bytes of data from the ODATA area of internal of ICP 14a will be transferred to the memory area in the OUTPACKET area pointed to by PPTR for eventual transfer to NXT DEV in the 1700Hz routine. ODATA is the result of ICP 14a's processing of the 16 bytes moved from computer 12 to the MDATA area in ICP 14a. ICP 14a also recopies the data contained in MDATA, which may have been altered by ICP 14a back to PCPACKET area pointed to by DPTR. As noted above, this transfer takes place because ICP 14a has limited internal memory space and the MDATA area will be required for processing the data for the next SEL DEV. The XMIT flag and transmit mode for SEL DEV is then set. Once ICP 14a completes the function the ACTIVE flag for SEL DEV will be reset and control will return to the Background Program.

The operation of IDC 22a will now be described in detail. As noted above, IDC 22a is for the purposes of this description; identical to the other IDCs of system 10 so a description of IDC 22a will suffice as a description for the other IDCs. For the purposes of this description, IDC 22a will be assumed to be attached to a servo controller, as mentioned above.

FIG. 6 shows the layout of a portion of the memory of IDC 22a. DMD is a 16 byte device mode temporary data area. IPAC is a 16 byte serial communication input area. AIPAC is a 16 byte spy mode input area. WRKREG is a 16 byte background working register. REG625 is a 16 byte working register for 588 microsecond service. IR6REG is a 16 byte interrupt service working register. OPAC is an 8 byte serial communication OUTPUT area. STACK is a 48 byte start of the system stack area. Additionally, control and indicator bits are located in an area of memory referred to as FLAGZ.

The program structure and operation of IDC 22a will now be described in detail with reference to FIGS. 7A-7E which are flow charts of the programs and subroutines of IDC 22a. As explained above in connection with the operation of ICP 14a, each of IDCs 22a-p are interrupted every 588 microseconds by the transmission of wake-up byte 56 by ICP 14a. This is referred to as the Wake-Up Interrupt Service Routine. This Routine provides a convenient real time interrupt to all of IDCs 22a-p. Thus, IDC 22a is interrupted by receiving 1700Hz wake-up byte 56 from ICP 14a. When IDC 22a is interrupted by wake-up byte 56, IDC 22a disables its UART/DMA hardware. IDC 22a then stores the received wake-up byte 56 and enables the UART receiver/DMA hardware to receive 16 bytes to the IPAC area of memory. Next, a Position Servo Interrupt is generated via a hardware output/input loop. The Position Servo Interrupt will be explained in detail below. As mentioned above, the microprocessor of the preferred embodiment is a Z8800 Zilog ™ Super 8. The Super 8 is not capable of auto-nested interrupts and because the Super 8 is already in an interrupt routine at this point, the Position Servo Interrupt Routine does not get executed until the end of the Wake-Up Interrupt Service Routine. After setting the Position Servo Interrupt, the RESPOND bit in FLAGZ is reset and the wake-up byte is checked to determine whether it is a synchronization wake-up byte or wake-up byte 56. If IDC 22a determines that it is a synchronization wake-up byte, the 100Hz flag in FLAGZ is set and control of IDC 22a will be returned to the Main Program from the Wake-Up Service Interrupt Routine. If the wake-up byte is instead wake-up byte 56, IDC 22a checks to see if the address of wake-up primary address or secondary address. If bits 0-3 of wake-up byte 56 do not match either the primary or secondary address of IDC 22a, the UART receiver./DMA hardware is disabled and control returns to the Main Program. If bits 0-3 of wake-up byte 56 match the primary address of IDC 22a and if the READ ONLY bit in wake-up byte 56, bit 4, is set, IDC 22a extracts receive mode bits, bits 5-7, of wake-up byte 56 and uses them to calculate a jump vector for the proper routine to load data to an output data packet. This jump vector is then saved. The UART transmitter/DMA hardware is then enabled to send 8 byte reply packet 60 and control is returned to the Main Program. If bits 0-3 of wake-up byte 56 match the primary address, but bit 4, the READ ONLY bit, in wake-up byte 56 is not set, the RESPOND and OVERRIDE bits in FLAGZ are set, the UART transmitter/DMA hardware is enabled to receive 16 byte data packet 58 from ICP 14a, transmit 8 byte data packet 60, and then control of IDC 22a is returned to the Main Program.

If bits 0-3 of wake-up byte 56 match the secondary address of IDC 22a, IDC 22a alters the UART receiver/DMA hardware to receive additional data. Depending on the state of the READ ONLY bit, as before, 16 byte data packet 58 might be received from ICP 14a into the IPAC area of memory and 8 byte data packet 60 will be received into the AIPAC area of memory from the primary IDC. Control is then returned to the Main Program. If bits 0-3 of wake-up byte 56 match the secondary device address of IDC 22a, but bit 4 of wake-up byte 56, the READ ONLY bit, is not set, control of IDC 22a is returned to the Main Program.

To be even more specific, a RxDMA Interrupt is generated when IDC 22a receives data from ICP 14a. IDC 22a first disables the UART receiver/DMA hardware. IDC 22a then determines whether IDC 22a matched the address of wake-up byte 56 with IDC 22a's primary address or its secondary address. If the address of wake-up byte 56 matched the primary address of IDC 22a, IDC 22a uses the previously defined jump vector in the Wake-Up Interrupt Routine to load appropriate data into the OPAC area of memory. This output packet is then transmitted back to ICP 14a as 8 byte data packet 60 reply by enabling the UART transmitter./DMA hardware. IDC 22a then uses the last byte of the 16 byte data packet 58 received from the ICP 14a to determine where to store the received data in IDC 22a.

If instead it was the secondary address of IDC 22a which matched the address of wake-up byte 56, and if it is necessary for IDC 22a to receive the reply of whichever of IDCs 22b-p matched the address in wake-up byte 56 with its primary address (the primary IDC), IDC 22a activates the UART receiver/DMA hardware to receive 8 more bytes. These 8 bytes are the 8 byte data packet 60 reply of the primary IDC. Again, using the last byte of the received data packet, IDC 22a determines where to store the received data in IDC 22a. The last communication interrupt associated with IDC 22a is the TxDATA Interrupt Subroutine. This interrupt simply disables the UART transmitter/DMA hardware IDC 22a has responded with 8 byte data packet 60. The TxDATA Interrupt Subroutine then returns control to the Main Program. The RxDMA and the TxDATA Interrupt Subroutines are not shown in detail in FIGS. 7A-7E.

As mentioned above, the Position Servo Interrupt Routine is generated from the Wake-Up Service Interrupt Routine every 588 microseconds when IDC 22a receives wake-up byte 56 from ICP 14a. This periodic Position Servo Interrupt Routine is an important feature of the invention because it keeps the real motor position of IDC 22a as close as possible to the ideal motor position. As explained above, the positions of an ideal motor are calculated periodically and the Position Servo Routine makes periodic comparisons between the real motor position and the ideal motor position so as to keep the real motor close to the ideal motor position. The error of the real motor position is easily calculated in the present invention because the only information needed for calculating the error is the real motor position and the ideal motor position. There is no need to know any other parameters such as where the real motor started, where it is going to stop, how fast it is going, etc. The only information necessary for controlling the real motor is the position of the ideal motor. The Position Servo Routine also adapts the operating variables and parameters to optimize performance of the task of keeping the real motor position as close to the ideal motor position as possible.

In short, the Position Servo Routine monitors the error between the real motor and the ideal motor position and then using this error and the information of whether the error is increasing or decreasing, the Position Servo Routine changes the operation and parameters of the real motor so that the real motor position is moved closer to the ideal motor position.

More specifically, if the pulse width modulation (PWM) amplifier is disabled, the Position Servo Routine keeps the ideal motor parameters in line with real motor parameters. This keeps the motor from jumping when the PWM amplifier is enabled. The rest of the Position Servo Routine is skipped and control returns to the Wake-Up Routine. If IDC 22a is in throttle mode, again the rest of the Position Servo Routine is skipped and control is returned to the Wake-Up Interrupt Routine.

If the PWM amplifier is neither disabled or in throttle mode, the error between the real motor position and the ideal motor position is calculated. The real motor position is referred to as CURP and the ideal motor position is referred to CARP so that error $E = CURP - CARP$. If $E = 0$, then the rest of the Position Servo Routine is skipped and control is returned to the Wake-Up Routine. Otherwise, the error calculated in the previous Position Servo Routine, OLDE, is subtracted from the current error E to get the change in error, DE, so that $DE = E - OLDE$. E is then saved as OLDE for the next Position Servo Routine. If the change in error DE is 0, the rest of the Position Servo Routine is skipped and control is returned to the Wake-Up Routine.

If, on the other hand, DE is not 0, this means that the error between the real motor position and the ideal motor is increasing or decreasing and the Position Servo Routine next determines which is the case. This information is input to a digital filter and in a manner well known in the art of servo control, new commands are sent to the PWM in an attempt to correct the real motor position so it more closely tracks the ideal motor position. After this, control is returned to the Main Program.

The Main Program of IDC 22a loops until the 100Hz time reference bit is set. The 100Hz flag in FLAGZ is set in the Wake-Up Interrupt Routine when IDC 22a receives a synchronization wake-up byte from ICP 14a. When the Main Program of IDC 22a determines that the 100Hz flag is set, the bit is reset and the Main Program calls a routine which calculates the new position of the ideal motor. This routine is called the CALC CARROT Subroutine. Every time the CALC CARROT Subroutine is called, 100 times a second, the current ideal position counter is recorded. This counter corresponds to the current position of the ideal motor. The last recorded ideal position count is then subtracted from the current ideal position count to determine the distance traveled (measured in fundamental units of transition of the shaft encoder of the motor which shall be referred to as clicks) over the last 1/100 seconds, or, the motors velocity in clicks/0.01 seconds. The value of the current ideal motor velocity is part of the information contained in 8 byte data packet 60 which IDC 22a transmits to ICP 14a.

If the motor is in a constant velocity mode, meaning that the motor is moving at some predetermined fixed velocity, it is known that the ideal motor in the preferred embodiment should be moving at a rate of 25,000 clicks/second or 250 clicks/0.01 second (the CALC CARROT time period). For the motor to move 250 clicks in the next 0.01 second, ideally it would move one click every 40 microseconds. To do this, the step generator is set up to interrupt every 40 microseconds thus giving a smooth transition of 250 clicks over the next 0.01 seconds.

If on the other hand, the motor is trying to reach a position rather than maintain a predetermined fixed velocity, the error between the desired position DESP and the current position of the ideal motor CARP is calculated so that $E = DESP - CARP$. E is then used as the desired number of clicks to move in the next 0.01 seconds. This E is then used, as in the above description where 250 clicks was the desired movement, to calculate the time constant for the step pulse generator. The sign of E is used to control the direction of the step pulse interrupt counter. If E=0, the step pulse generator is stopped. The CALC CARROT routine then returns control to the Main Program.

After control is returned to the Main Program, IDC 22a checks to see if an over current bit in FLAGZ is set by calling the Over Current Management Subroutine. If the over current bit is set, IDC 22a reduces the maximum PWM setting. If the maximum PWM setting ever becomes 0, the Main Program disables the PWM amplifier, generates an error condition and returns control to the Main Program. If the over current bit is not set, IDC 22a increases the maximum PWM setting and control is returned to the Main Program.

The Main Program then calls the Limit Input Management Subroutine which first copies the limit status (on/off) to the LIMIT bits in FLAGZ. The limit input interrupts, as will be explained later, cause the current position of the real motor to be recorded at that time. All limit interrupts are then restored and control is returned to the Main Program.

The Main Program of IDC 22a then checks to see whether IDC 22a is in a SPY MODE or not. To do this, the Main Program first checks the OVRRIDE bit in FLAGZ to determine whether it is set and if it is not set, IDC 22a executes a NO SPY MODE Subroutine. If the OVRRIDE bit is set, IDC 22a checks to see if the SPY MODE bit in FLAGZ is set and if it is, IDC 22a executes the SPY MODE Subroutine, and if not, IDC 22a executes the NO SPY MODE Subroutine.

In the NO SPY MODE Subroutine, the OVRRIDE bit is first reset. After that, the NO SPY MODE Subroutine makes a copy of the current primary device mode. This information is found in the last byte of the 16 byte data packet 58 which ICP 14a transmitted to IDC 22a. The original mode information is cleared and the copy is checked to make the sure the mode falls within proper boundaries. If the mode is out of range, control is returned to the Main Program. Using the current primary device mode, the NO SPY MODE Subroutine calculates the proper mode dependent subroutine address in the memory of IDC 22a and executes this mode dependent subroutine.

There are several mode dependent subroutines which can be executed from the NO SPY MODE Subroutine. In mode 0, IDC 22a does nothing. In mode 1, IDC 22a records the position constant for an upcoming trapezoidal velocity profile move, more fully explained below. In mode 2, IDC 2a executes the linear acceleration portion of a trapezoidal velocity profile move. In mode 3, IDC 22a executes the constant velocity portion of a trapezoidal velocity profile move. In mode 4, IDC 22a executes the deceleration portion of a trapezoidal velocity profile move. In mode 5, IDC 22a sets a new ideal desired position DESP. In mode 6, IDC 22a sets the PWM counter according to the received value and restricts the Position Servo Interrupt. In mode 7, IDC 22a presets the ideal and real motor position counters. In mode 8, a new velocity constant is set by IDC 22a. In mode 9, IDC 22a adds a given constant to a velocity constant to cause acceleration of the ideal motor. In mode 10, gain constants for the Position Servo Interrupt are set by IDC 22a. In mode 11, IDC 22a sets or resets the alternate device address and type of spy mode, if any, for IDC 22a. In mode 12, the power amplifiers are enabled and in mode 13, the power amplifier is disabled. After the Mode Dependent Subroutine is executed, control is returned to the Main Program.

In the SPY MODE Subroutine, a copy of the current secondary device mode is first made. This current secondary device mode information is found in the last byte of 16 byte data packet 58 received by IDC 22a from ICP 14a. The original mode information is cleared and the copy is checked for proper boundaries. If the mode is out of range, control is returned to the Main Program. The SPY MODE Subroutine uses the current secondary device mode information to calculate the proper mode dependent subroutine address and then executes it. As with the NO SPY MODE mode dependent subroutines, there are several mode dependent subroutines which can be executed from the SPY MODE Subroutine. In Mode 0, IDC 22a does nothing. In mode 1, IDC 22a multiplies the just received current position of the target IDC by a preset scaling factor and uses the result as a new desired ideal motor position DESP. In mode 2, IDC 22a multiplies the just received current power setting of the target IDC by a preset scaling factor and uses this result as a new power setting. After the SPY MODE mode dependant subroutine is finished, control is returned to the Main Program.

IDC 22a also executes three other noncommunication interrupt servicing routines, in addition to the Position Servo Routine. The Over Current Interrupt is caused by a greater than maximum current flow in the output stages of the PWM amplifier. This Interrupt makes note of the fact that it occurred by setting an over current bit in FLAGZ. The Interrupt then disables itself because the hardware of the power amplifier is switching direction at 80,000Hz which will cause over currents and their interrupts at a very high rate thereby causing fatal interrupt overhead problems leaving no time for anything else. The status of this over current bit is checked with the Over Current Management Subroutine called from the Main Program.

Another of the noncommunication interrupt routines is the Limit Interrupt. This Interrupt is generated by activating any one of three external pins on IDC 22a. As a result of one of these pins being activated, the current ideal motor position is recorded as well as the source of the interrupt. These two values are transmitted in the 8 byte data packet 60 reply from IDC 22a to ICP 14a.

The last noncommunication interrupt servicing routine is the Step Generator Interrupt. This Interrupt is caused by an overflow in the step pulse generator. This Interrupt will increase or decrease the ideal motor position by the step rate. The step rate is needed to limit the rate at which this Interrupt can occur. For example, if this is interrupting at 10,000 times a second with a step rate of 1, the ideal motor would be going 10,000 clicks per second. If this interrupt were interrupting at 1,000 times per second with a step rate of 10, then the ideal motor is still going 10,000 clicks per second but the interrupt overhead has been reduced by a factor of 10. Whether this interrupt increases or decreases the ideal motor position by the step rate is determined by the DIRECTION flag in FLAGZ.

Figure 8:
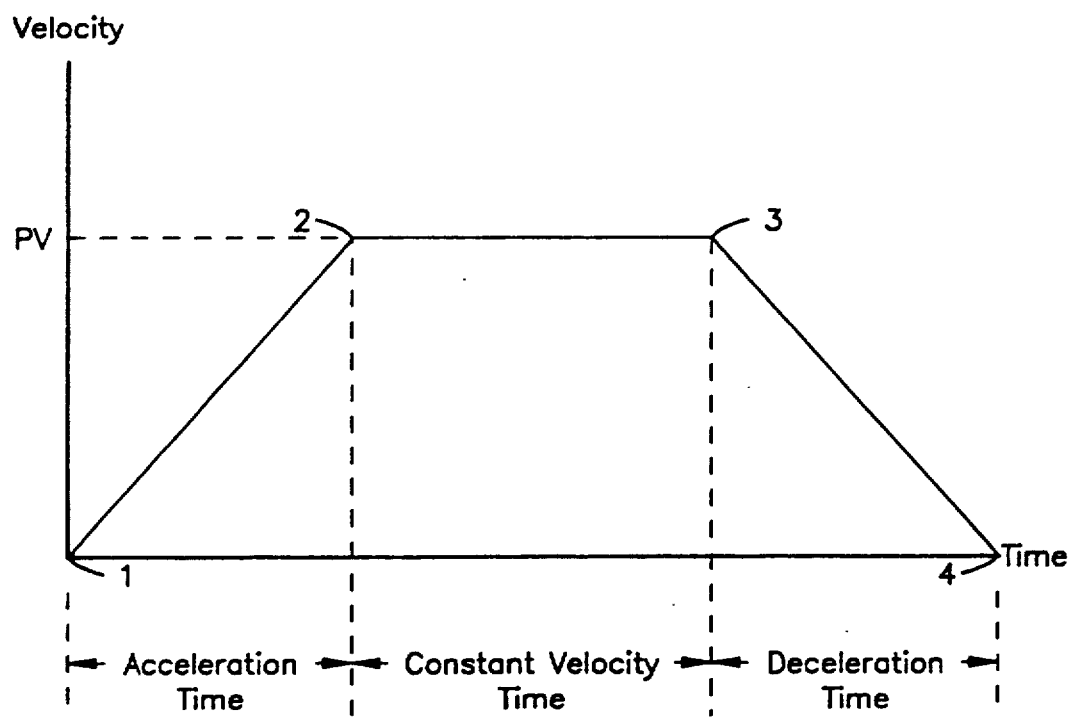
FIG. 8 is a graphical representation of a trapezoidal velocity profile move of the present invention.

The purpose of the intelligent device controller system 10 is to control devices attached to the IDCs of system 10. As explained above, the operation of system 10 is being explained with servo motors as the devices connected to IDCs. The servo motors are usually moved in what is called a trapezoidal velocity profile move. FIG. 8 is a diagrammatical representation of a trapezoidal velocity profile. The method of executing a trapezoidal velocity profile move will be explained with reference to FIG. 8 and the descriptions above of the ICP 14a and IDC 22a.

FIG. 8 shows the velocity of servo motor 70, the servo motor connected to IDC 22a, plotted against time. From time 1 to time 2 in FIG. 8, servo motor 70 accelerates from a resting position, zero velocity, to peak velocity. From time 2 to time 3, servo motor 70 maintains a constant velocity equal to the peak velocity. From time 3 to time 4, servo motor 70 decelerates from peak velocity to a resting position.

The method of executing a trapezoidal velocity profile move will be explained with reference to servo motor 70 connected to IDC 22a. Servo motors connected to other IDCs in system 10 would be moved in the same way such that a description of a move of servo motor 70 will suffice as a description of moving the other servo motors in system 10. The move starts with a user interfacing with DCOS of computer 12. The user specifies an end point for servo motor 70. The user also specifies the maximum velocity and the maximum acceleration to DCOS.

DCOS then calculates the acceleration time and distance, the constant velocity time and distance, and the deceleration time and distance. The acceleration distance is the distance servo motors 70 travels in click units during the acceleration time, time 1 to time 2 in FIG. 8. The constant velocity distance is the distance servo motor 70 travels in clicks during the constant velocity time, time 2 to time 3 in FIG. 8. The deceleration distance is the distance in clicks traveled by servo motor 70 during the deceleration time, time 3 to time 4 in FIG. 8.

The following example will illustrate how DCOS calculates these distances and times from the information input by the user. First of all the user tells DCOS to move servo motor 70 of IDC 22a connected to ICP 14a to position 144,000 at a maximum velocity of 50,000 clicks per second accelerating no faster than 50,000 clicks per second per second. DCOS then reads the current position of servo motor 70 and determines the total number of clicks to be traveled. The total clicks to be traveled equals the desired position minus the current position. In the present example, the current position is assumed to be 0 so total clicks = 144,000 − 0 = 144,000.

DCOS then calculates the required acceleration time. Acceleration time equals the peak velocity divided by the maximum acceleration. In this example, acceleration time = 50,000/50,000 = 1. Because the trapezoidal velocity profile move is symmetrical, the deceleration time = the acceleration time = 1. Next, DCOS calculates the average velocity during the acceleration to determine the acceleration distance. Average velocity equals peak velocity divided by 2. In this example, average velocity = 50,000/2 = 25,000. Acceleration distance equals average velocity times acceleration time. In this example, acceleration distance = (25,000)(1) = 25,000. Again, because the trapezoidal velocity profile move is symmetrical, the deceleration distance = the acceleration distance = 25,000.

With these values calculated, the constant velocity time and distance to be traveled during that time can be calculated. The constant velocity distance equals the total distance minus the acceleration distance minus the deceleration distance. In this example, constant velocity distance = 144,000 − 25,000 − 25,000 = 94,000. Constant velocity time equals the constant velocity distance divided by peak velocity. In this example, constance velocity time = 94,000/50,000 = 1.88.

Next, DCOS converts the time parameters to the time units ICP 14a uses, −1/100 seconds. To convert the times, DCOS multiplies the acceleration time, constant velocity time, and deceleration time by 100. To summarize this example, DCOS has calculated the following parameters: acceleration time = 100, acceleration distance = 25,000 clicks, constant velocity time = 188, constant velocity distance equals 94,000 clicks, deceleration time equals 100 and deceleration distance equals 25,000 clicks.

Once DCOS has calculated these parameter values, DCOS communicates the acceleration distance, the constant velocity distance and the deceleration distance values directly to IDC 22a by using the PASS THRU function of ICP 14a discussed above. Next, DCOS communicates the acceleration time, constant velocity time and deceleration values to ICP 14a and directs ICP 14a to execute the trapezoidal velocity profile move.

ICP 14a when executing a trapezoidal velocity profile move basically does one thing: it creates a "percent complete" figure for a given time period in one of the trapezoidal segments, i.e., the acceleration segment, the constant velocity segment, or the deceleration segment. For example, if the current time period is 36 and, using the same example as above, the acceleration time is 100, ICP 14a divides the current time period by the acceleration time and then squares the result. This calculation provides an exponentially changing ratio of elapsed time to total time for this acceleration segment. ICP 14a then transmits this ratio to IDC 22a. IDC 22s uses the ratio it receives from ICP 14a by multiplying it by the total distance to be traveled in the acceleration segment, the total distance is the acceleration distance which DCOS has already communicated to IDC 22a. The result is the current desired position offset in that time period.

The current desired position offset is used in the following manner. At the beginning of a segment, IDC 22a records the current position of servo motor 70 to be used as a reference. The current desired position offset is added to this beginning reference to obtain the real desired position for that time period. This desired position is referred to in the above description of IDC 22a as DESP.

When the time for a segment has expired, ICP 14a will attempt to send IDC 22a a ratio of one. Because of the method used to pass the ratio to IDC 22a, it is impossible to send the number 1. In lieu of this, an end-of-segment flag is sent instead and IDC 22a assumes the ratio to be 1.

In the above example, the acceleration segment was discussed and the ratio was the square of elapsed time divided by acceleration time. The ratio for the deceleration segment is the square of elapsed time divided by deceleration time. The ratio, however, for the constant velocity segment is elapsed time divided by constant velocity time.

It can seen that this invention provides a control system which allows the efficient control of several servo motors or other devices with minimum communication. Because of the nature of the control system, including the availability of the spy mode, it is possible to interpolate several devices quite easily. The user, working at computer 12, specifies end points, maximum velocity and maximum acceleration for several IDCs. DCOS then calculates the longest time for each segment as well as the segment distances for all IDCs involved. Next, all concerned IDCs are sent the respective segment distances by computer 12. Also, a primary IDC is ascertained and the rest of the IDCs involved instructed to spy on (receive data sent to) the primary IDC. ICP 14a then begins its normal routine, as described above, in executing a trapezoidal velocity profile move. During the execution of the trapezoidal velocity profile move, all IDCs that have been referenced receive the ratio value at the same point in time and react to it at the same time. This allows all referenced IDCs to finish their respective moves at exactly the same time and to all be moving roughly the same percentage of the total distance at any one time. It can be seen that due to the spy mode and just using one ratio, ICP 14a did very little more work in communicating with and directing several IDCs then it does for one IDC.

It is to be understood, however, that even though numerous characteristics and advantages of the present invention have been set forth in the foregoing description, together with details of the structure and function of the invention, the disclosure is illustrated only, and changes may be made in detail, especially in matters of specific programing or routines within the principles of the invention to the full extent indicated by the broad general meaning if the terms in which the appended claims are expressed.

What is claimed is:

1. A system for controlling a plurality of devices, comprising:
   a central processor;
   at least one communication processor connected to the central processor;
   a plurality of device processors each having a memory for storing device commands, status information and data;
   a bus means connecting the communication processor to each device processor;
   each of the device processors further connected to one another via said bus means and to one of the plurality of devices;
   instruction means connected to the central processor for receiving a user instruction for simultaneously controlling the operation of preselected ones of the plurality of devices, translating the user instruction to a command, and communicating the command to the communication processor;
   first communication means connected to the communication processor for receiving a command from the central processor, formulating a device command from the received command, sending the device command to a first selected device processor connected to a first one of said devices to be controlled by the device command, receiving status information about the controlled device from the first selected device processor, and sending the device command to at least one second selected device processor connected to a second one of said devices;
   a plurality of second communication means, one said second communication means connected to each device processor for receiving device commands directly from the communication processor and for sending status information about the connected device to the communication processor;
   a plurality of monitor means, one said monitor means connected to each device processor and including memory means for monitoring and storing device commands sent by the first communication means to other device processors and for monitoring and storing in the device processor memory status information sent by the second communication means of other device processors to the communication processor; and
   a plurality of control means, one said control means connected to each said second device processor for controlling the operation of the connected device based on a device command received by the first device processor directly from the second communication means and the status information of said first device processor stored by the monitor means of each said second device processor.

2. A system for controlling a plurality of devices, comprising:
   a central processor;
   at least one communication processor connected to the central processor;
   a plurality of device processors connected to the communication processor, each device processor connected to one of the plurality of devices;
   instruction means connected to the central processor for receiving instructions for controlling the operation of preselected ones of the plurality of devices and formulating commands from the received instructions;
   first communication means connected to the central processor for sending commands to the communication processor;
   second communication means connected to the communication processor for receiving commands from the central processor, formulating device commands from the received commands, and forwarding the device commands to the device processors connected to the preselected devices;
   addressing means for designating one of the device processors as a primary processor and the others of said device processors as secondary processors; and
   a plurality of control means including one said control means connected to each device processor for receiving a device command from the communication processor, processing the command, and controlling the operation of the device connected to the primary processor based on the device command, and for controlling operation of each of the devices connected to one of the secondary processors based upon the device command and status information generated by the primary processor and received and stored by each of the secondary processors.

3. A system for controlling the operation of a plurality of different types of devices, comprising:
   a central processor;
   at least one communication processor connected to the central processor;
   a plurality of device processors connected to the communication processor, each device processor connected to one device of the plurality of the devices;
   instruction means connected to the central processor for receiving instructions for controlling the operation of preselected ones of the plurality of devices and formulating commands from the received instructions;

first communication means connected to the central processor for sending commands to the communication processor;

second communication means connected to the communication processor for receiving commands from the central processor, formulating device-independent commands from the received commands, and forwarding the device-independent commands to the device processors connected to the preselected devices;

an addressing means for designating one of the device processors as a primary device processor and the other device processors as secondary device processors; and control means connected to each device processor for receiving a device-independent command from the connected communication processor, translating the device-independent command to a device-dependent command, controlling the operation of the device connected to the primary processor based on the device-dependent command, and controlling the operation of the devices connected to the secondary processors based on the device-dependent command and status information generated by the primary processor and received and stored by each of the secondary processors.

4. A method of simultaneously controlling preselected devices of a plurality of devices, comprising the steps of:

(a) controlling each device with a separate device processor;

(b) controlling the device processors with a communication processor;

(c) controlling the communication processor with a central processor;

(d) providing instructions to the central processor and formulating commands in the central processor in response to the instructions;

(e) sending the commands from the central processor to the communication processor;

(f) receiving the commands in the communication processor;

(g) formulating a device command from the received commands;

(h) sending the device command to a primary one of the device processors connected to one of the preselected devices;

(i) monitoring the device command sent in step (h) with secondary ones of the preselected device processors connected to the other preselected devices;

(j) storing the device command in the secondary device processors monitoring the device command in step (i) and in the primary device processor that received the device command in step (h);

(k) sending status information from the primary device processor to the communication processor and to the secondary device processors, responsive to receiving said device command, (l) calculating device specific commands for the devices connected to each of the secondary device processors that stored the device command in the step (j) by using said status information stored in the secondary device processors and the device command stored in the secondary device processors; and (m) simultaneously controlling the operation of the preselected devices using the device specific commands.

* * * * *